United States Patent
Gold et al.

(10) Patent No.: US 6,701,450 B1
(45) Date of Patent: Mar. 2, 2004

(54) SYSTEM BACKUP AND RECOVERY

(76) Inventors: Stephen Gold, Rock Cottage, Stone Lane, Winterbourne Down, Bristol BS36 1DJ (GB); Ian Peter Crighton, 1 Old Manor Cottages, Winterbourne Hill, Winterbourne, Bristol BS36 1JS (GB)

( * ) Notice: Subject to any disclaimer, the term of this patent is extended or adjusted under 35 U.S.C. 154(b) by 0 days.

(21) Appl. No.: 09/529,113
(22) PCT Filed: Aug. 6, 1999
(86) PCT No.: PCT/GB99/02594
§ 371 (c)(1),
(2), (4) Date: Apr. 7, 2000
(87) PCT Pub. No.: WO00/08561
PCT Pub. Date: Feb. 17, 2000

(30) Foreign Application Priority Data

Aug. 7, 1998 (EP) .............................. 98306358

(51) Int. Cl.[7] ................................ G06F 11/00
(52) U.S. Cl. .......................... 714/5; 711/162
(58) Field of Search .................. 714/5, 13, 15, 714/16, 42, 43, 51, 54; 711/161, 162

(56) References Cited

U.S. PATENT DOCUMENTS

| | | | |
|---|---|---|---|
| 5,269,022 A | | 12/1993 | Shinjo et al. |
| 5,469,573 A | * | 11/1995 | McGill et al. .............. 395/700 |
| 5,727,213 A | * | 3/1998 | Vander Kamp et al. ..... 395/681 |
| 5,812,748 A | * | 9/1998 | Ohran et al. ............ 395/182.02 |
| 5,907,672 A | * | 5/1999 | Matze et al. ........... 395/182.06 |
| 5,930,824 A | * | 7/1999 | Anglin et al. ............... 711/162 |
| 6,029,232 A | * | 2/2000 | Honda ......................... 711/162 |
| 6,088,815 A | * | 7/2000 | West et al. ................... 714/15 |
| 6,134,673 A | * | 10/2000 | Chrabaszcz ................. 714/13 |
| 6,154,852 A | * | 11/2000 | Amundson et al. ........... 714/5 |

FOREIGN PATENT DOCUMENTS

EP 0 597 654 A 5/1994

* cited by examiner

Primary Examiner—Nadeem Iqbal

(57) ABSTRACT

A tape drive operates as a bootable device for a PC. In a first mode, the drive operates as a normal tape drive. In a second mode, the drive emulates a bootable CD-ROM drive. Application software for backing up and restoring computer system data causes the PC running the software to generate a bootable image comprising an operating system including the PC hardware configuration, and data recovery application software. The bootable image can re-build the PC in response to a disaster, such as hard disk corruption or system destruction. The bootable image is stored on tape in front of a file system backup data set. In the second mode, the tape drive boots the PC and restores the operating system and application software. When loaded, the application software switches the tape drive into the first operation mode and restores the file system backup data set to the PC.

54 Claims, 5 Drawing Sheets

SYSTEM BACKUP AND RECOVERY

TECHNICAL FIELD

The present invention relates specifically, although not exclusively, to data backup and recovery in data processing systems and, in particular, to magnetic tape based data backup and recovery.

BACKGROUND ART

For convenience of description herein, the term 'computer system' (or computing apparatus) means an Intel™ microprocessor (or equivalent) based computer system, for example a Pentium™ system, typically operating under an MS-DOS, Windows™ NT or 95/98 operating system environment. Commonly, such a computer system is known as a PC, although the description relates equally to servers, notebooks or laptop computers. It is emphasised, however, that the concepts disclosed herein may be equally applicable to other known, or to be developed, types of computer system. As such, the invention is not intended to be limited to only PC-type systems.

It is well-known to back up data stored on primary storage, such as a hard disk, of a computer system in order to protect against a disaster that might otherwise irrecoverably destroy all or part of the data. Disasters may for example be fire, flood, computer virus or simply accidental deletion of data. One of the main reasons for using magnetic tape as the backup storage medium is that it provides a stable, reliable and relatively cheap option for storing large volumes of backed up data.

Backup application software which executes on the computer system typically provides the functions for enabling such computer system data to be both backed up to, and restored from, tape media, which is written to and read from by a tape drive. Well-known backup application software includes 'Replica™' from Stac, 'ArcServe™' from Computer Associates, 'BackupExec™' from Veritas and 'Omniback™' from HP. Well-known tape drives include DDS™ and LTO™ compliant tape drives, both available from HP.

Generally, backup application software comprises one or more computer programs for managing data backup and restore operations on a computer system. Typically, the software provides a user interface, which gives the user the opportunity to select which data, or files, the user wishes to back up. The user may select for backup, for example, all files that have been generated or amended since the last backup, all files in a specific directory (or directories), or simply all files (i.e. the whole hard disk system). In addition, backup application software typically permits the user to schedule backup operations to occur when the computer system is not being used, for example at midnight each night. Then, at midnight each night, the backup application software identifies all the files that need to be backed up and stores the files to tape media in the form of a backup data set. In particular, the backup application software will typically format the backup data set into individual records on tape and precede the data set with some form of proprietary information, for example, identifying the backup application software used, the date of the backup, the time of the backup, etc.

In the event of a disaster, such as hard disk failure or even system destruction, typically, a priority is to rebuild a working system as soon as possible. This requires the computer hardware to be restored to the same state as it was before the disaster, which can take hours or even days, even before the file system can be restored. Generally, a significant amount of human intervention is required to complete this process.

In order to reduce the time and human intervention overhead of restoring a computer system after a disaster, some backup application software provides a so-called disaster recovery (DR) solution, which enables a computer system to be restored in an expedited manner to a state which existed before a disaster occurred. Such a scheme typically involves at least installing and configuring a minimal operating system, tape drivers and the backup application software (or the requisite parts thereof) itself.

Known DR solutions typically require a user to generate a set of DR floppy disks. The DR floppy disks may be used to boot the computer system, when it is not possible to boot from the hard disk drive, and execute application software for recovering a backed-up copy of the file system from tape media. The DR floppy disks typically load and execute a minimal version of the operating system along with components of application software comprising DR functionality, thus providing sufficient functionality, for example, for the computer to build new disk partitions, access a tape drive and restore the data from tape media.

The DR operating system is required to reflect the exact hardware configuration of the computer system on which it is to be installed, otherwise it would not be possible to communicate with storage devices such as tape drives.

Typically, therefore, DR floppy disks need to be regenerated by a user whenever the system hardware configuration changes, and particularly when a SCSI (Small Computer Systems Interface) configuration changes. For example, if a new SCSI Host Bus Adaptor (HBA) is added to a server, with a respective new device driver, this device driver needs to be added to the DR floppy disks so that the new SCSI HBA is recognised when rebuilding the computer system.

Generally, therefore, having 'current' DR floppy disks available relies on a user generating them, keeping them up to date, and being able to find them if a disaster occurs. This is an overhead, which sometimes leads to DR floppy disks not being generated at all, disks being allowed to get out of date, or disks being misplaced over time.

A reason why DR floppy disks are used is that a floppy disk-drive is one of the standard 'initial program load devices' (IPLD), which practically every PC is configured to 'boot' from. Herein, 'standard', as applied to an IPLD, implies that the PC is physically programmed to recognise the device for the purposes of booting. Currently, other standard IPLDs, sometimes known as BAIDS (BIOS Aware Initial Program Load Devices), include the first hard disk drive in a PC and, more recently, the first CD-ROM drive in a PC. Generally, however, an IPLD can be virtually any device that has the ability to load and execute a PC operating system.

As already mentioned, it is now possible to boot from a CD-ROM drive, as long as the CD-ROM complies with the ISO 9660 CD-ROM standard, as extended by the 'El Torito' Bootable CD-ROM Format Specification, Version 1.0, Jan. 25, 1995, created jointly by IBM Corporation and Phoenix Technologies Ltd. Booting from CD-ROM in a similar manner is also considered in detail in U.S. Pat. No. 5,727,213. As described, to boot from CD-ROM, a PC's BIOS (basic input/output system) needs to specifically support reading boot record data from a CD-ROM, typically, as well as from a floppy disk or hard disk. U.S. Pat. No. 5,727,213 also proposes that tape media may also serve as a boot source, subject to the PC BIOS being modified to detect and read boot record data from a tape media. To date, however, PC BIOS standards do not support booting from tape media.

In a system which is bootable from a CD-ROM, U.S. Pat. No. 5,727,213 specifies that, to read boot record data from a CD-ROM, read commands directed to the floppy disk drive need to re-directed to the CD-ROM drive during a read data part of the boot process. In addition, a modified SCSI driver of the PC needs to convert the 512 byte sectors conventionally used by hard disk and floppy disk into 2 Kbytes sectors conventionally used by a CD-ROM drive.

In view of the possibility of booting from CD-ROM, it would obviously also be possible to generate one or more DR CD-ROMs to replace the DR floppy disks. However, there would be little advantage in adopting this approach, and a significant cost increase. In particular, it would still be onerous for the user to have to generate, maintain and keep safe the DR CD-ROMs.

It is one object of the present invention to provide a more convenient DR solution.

DISCLOSURE OF THE INVENTION

According to a first aspect, the present invention provides a method of executing application software in a system comprising computing apparatus and tape drive apparatus, the computing apparatus being bootable from a kind of initial program load device that is not a tape drive apparatus, the method comprising the steps of:

generating bootable tape media, by storing to the tape media both application software and bootable data corresponding to that which a said kind of initial program load device would provide to the computing apparatus during booting of the latter from that device;

initiating booting of the computing apparatus, thereby causing the computing apparatus to attempt to locate a said kind of initial program load device;

controlling the tape drive apparatus to emulate a said kind of initial program load device for interactions with the computing apparatus whilst the latter is booting, whereby the tape drive apparatus identifies itself to the computing apparatus as an initial program load device of the aforesaid kind; and continuing with the computing apparatus recognising the tape drive apparatus as a said kind of initial program load device, booting from the bootable data and executing the application software.

According to a second aspect, the present invention provides tape drive apparatus, comprising:

a mechanism for controlling the position and motion of loaded tape media;

a read/write circuit for transferring data between the loaded tape media and the tape drive apparatus; and a controller for controlling the operation of the tape drive apparatus to identify loaded tape media as containing bootable data, receive from the computing apparatus and processes signals which are intended for a kind of initial program load device that is not a tape drive apparatus and generate response signals which the computing apparatus would expect from the said kind of initial program load device.

The foregoing method and apparatus permits a computer system, which may not support booting from tape drive apparatus, to boot from the latter and execute application software, for example DR application software.

According to a third aspect, the present invention provides a method of performing a data recovery operation in a system comprising computing apparatus and tape drive apparatus, the computing apparatus being bootable from a kind of initial program load device that is not a tape drive apparatus, the method comprising the steps of:

generating a recovery tape media, by storing to the tape media both a backup data set and bootable data corresponding to that which a said kind of initial program load device would provide to the computing apparatus during booting of the latter from that device;

initiating booting of the computing apparatus, thereby causing the computing apparatus to attempt to locate a said kind of initial program load device;

controlling the tape drive apparatus to emulate a said kind of initial program load device for interactions with the computing apparatus whilst the latter is booting, whereby the tape drive apparatus identifies itself to the computing apparatus as an initial program load device of the aforesaid kind; and continuing with the computing apparatus recognising the tape drive apparatus as a said kind of initial program load device, booting from the bootable data, causing the tape drive apparatus to operate as a tape drive apparatus and recovering the backup data set therefrom.

As such, the invention obviates DR floppy disks entirely by storing all the data required for DR onto a single piece of tape media and providing a tape drive which acts like an initial program load device even though it is may not be recognised as one. As a result, minimal human intervention is required to enact DR.

The computing apparatus may be arranged to generate bootable data which complies with the ISO 9660 format for CD-ROM apparatus and the El Torito Bootable CD-ROM Format Specification. Other appropriate formats may be available in future.

The bootable data comprises data and/or files which, when executed, allow the computing apparatus to access a tape drive apparatus and restore therefrom the backed-up data set from the recovery tape media loaded in the tape drive apparatus.

Preferably, the bootable data is written to the recovery tape media starting a pre-determined offset from the beginning of the tape media. As such, appropriately configured tape drive apparatus can read the tape media and locate the bootable data. Preferably, the tape drive apparatus locates the start of the bootable data on the tape media by starting from the logical beginning of the tape media and reading forwards by the pre-determined number of blocks.

In a preferred embodiment, the bootable data is written to recovery tape media starting in the $21^{st}$ block from the logical beginning of the recovery tape media.

The tape drive apparatus may be controlled to emulate the initial program load device by user operation of initialisation means associated with the tape drive apparatus.

In a preferred embodiment, the initialisation means comprises operating an eject button of the tape drive apparatus while the tape drive apparatus is being powered on.

In addition, preferably, the tape drive apparatus may be arranged to switch to operation as a tape drive apparatus in response to receipt of a specific signal from the computing apparatus.

Alternatively, the tape drive apparatus may be arranged to switch to operation as a tape drive apparatus in response to receipt of a specific signal from the computing apparatus in combination with an amount of data exceeding a predetermined threshold having been read by the computing apparatus from the tape drive apparatus.

Preferably, in response to a status request signal from the computing apparatus, which is attempting to locate a said kind of initial program load device, the tape drive apparatus returns a signal indicating that it is in the process of loading media, even if media is not present, thereby to cause the computing apparatus to wait for an extended period of time before attempting to communicate with an alternative initial program load device.

In order to improve apparent performance of the tape drive apparatus, the tape drive apparatus is arranged to read from the recovery tape media and cache into volatile memory means of the tape drive apparatus at least some of the bootable data.

In particular, said cached bootable data includes directory data representative of the arrangement of the files comprised in the bootable data. As such, the tape drive apparatus needs only to access the tape media once in response to multiple accesses of said directory data by the computing apparatus.

In addition, or alternatively, said cached bootable data may include at least some files in the bootable data that need to be accessed more than once during the recovery operation. As such, the tape drive apparatus needs only to access the tape media once to read said files in response to multiple reads of said files by the computing apparatus.

The computing apparatus may generate bootable data comprising a plurality of data files by ordering the files in substantially the order in which they are subsequently required to be read by the computing apparatus from the recovery tape media for the purposes of a recovery operation.

In accordance with a fourth aspect, the present invention provides tape drive apparatus, comprising a mechanism for controlling the position and motion of loaded tape media;
- a read/write circuit for transferring data between the loaded tape media and the tape drive apparatus; and
- a controller for controlling the operation of the tape drive apparatus, there being two modes of operation of the tape drive apparatus, characterised in that the controller is arranged to selectively control the tape drive apparatus to operate in either one of the two modes of operation, in which:
  - a) in a first mode, the tape drive apparatus identifies loaded tape media as containing bootable data, receives from the computing apparatus and processes signals which are intended for a kind of initial program load device that is not a tape drive apparatus and generates response signals which the computing apparatus would expect from the said kind of initial program load device; and
  - b) in a second mode, the tape drive apparatus operates in accordance with tape drive apparatus operation.

When in the first mode, the controller may be arranged to generate, in reply to a device type inquiry signal from the computing apparatus, a response identifying the tape drive apparatus as the said kind of initial program load device.

Preferably, when in the first mode, the controller is arranged to identify the loaded tape media as containing bootable data by reading from tape media data starting a predetermined offset from the beginning of the recovery tape media.

In a preferred embodiment, the predetermined offset is the $21^{st}$ block from the logical beginning of the recovery tape media.

In a preferred embodiment, the apparatus further comprises random access memory means, wherein the controller is arranged to read at least some of the bootable data into the random access memory, such that for subsequent accesses of said data by the computing apparatus the controller accesses the random access memory rather than the tape media.

Preferably, the apparatus further comprises user selection means responsive to user operation to cause the tape drive apparatus to operate in the first mode.

In a preferred embodiment, the user selection means comprises an eject button of the tape drive apparatus, and the controller is arranged to detect user operation of the eject button during a power on, or reset, operation of the tape drive apparatus.

In addition, the controller may be responsive to receipt of a particular signal from the computing apparatus to switch the operation of the tape drive apparatus from the first mode to the second mode.

Generally, the initial program load device is a CD-ROM drive.

Other embodiments and aspects of the invention will become apparent from the following description, claims and drawings.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

BEST MODE FOR CARRYING OUT THE INVENTION, & INDUSTRIAL APPLICABILITY

There will now be described by way of example only the best mode contemplated by the inventors for carrying out the invention. In the following description numerous specific details are set forth in order to provide a thorough understanding of the present invention. It will be apparent however, to one skilled in the art, that the present invention may be practised without using these specific details. Also, well-known methods and structures have not been described in detail so as not to unnecessarily obscure the present invention.

As already alluded to above, currently, PC BIOS standards specify booting from floppy disk, hard disk or CD-ROM devices. In addition, the standards do allow for remote booting across networks, for example using Plug and Play (PnP) functionality (for reference, see for example the "Plug and Play BIOS Specification", Version 1.0A, by Compaq Computer Corporation, Phoenix and Intel Corporation). For a detailed description of a current BIOS standard, see for example "BIOS Boot Specification", Version 1.01, Jan. 11, 1996, by Compaq, Phoenix and Intel.

In the light of current BIOS standards and of the difficulties perceived by the present inventors in creating and maintaining up-to-date DR floppy disks, the present inventors have developed an improved DR solution, which facilitates DR using only appropriate application software, an appropriate tape drive and a recent tape backup of the file system of a PC that needs to be restored. Significantly, there is no need for generating, updating or keeping DR floppy disks or the like. Significantly, also, the solution described herein requires no changes to be made to the computer hardware, BIOS or operating system in order to function. These features are believed by the present inventors to represent significant advantages over known backup solutions.

In future, it is anticipated that BIOS standards may be amended to allow booting from a tape drive, thereby apparently obviating the present DR solution. However, booting from a tape drive would only be supported by newer computer systems which support such a new BIOS. Therefore, the present invention will remain significant, even if BIOS standards are amended, in order that computer systems running an older BIOS can enact the present DR solution. In addition, the present solution would still operate in newer systems, which were running such a new BIOS, so the solution would remain universally usable. Indeed, the ability for a computer system to boot from a tape drive, where the former may not recognise the latter as an IPLD, may find broader application that in just the present DR solution. For example, the concept of having bootable tape media may be used in conjunction with any application, not just a DR application, stored on the same, or even different, tape media.

Hardware suitable for operating an embodiment of the present invention will now be described.

Figure 1:
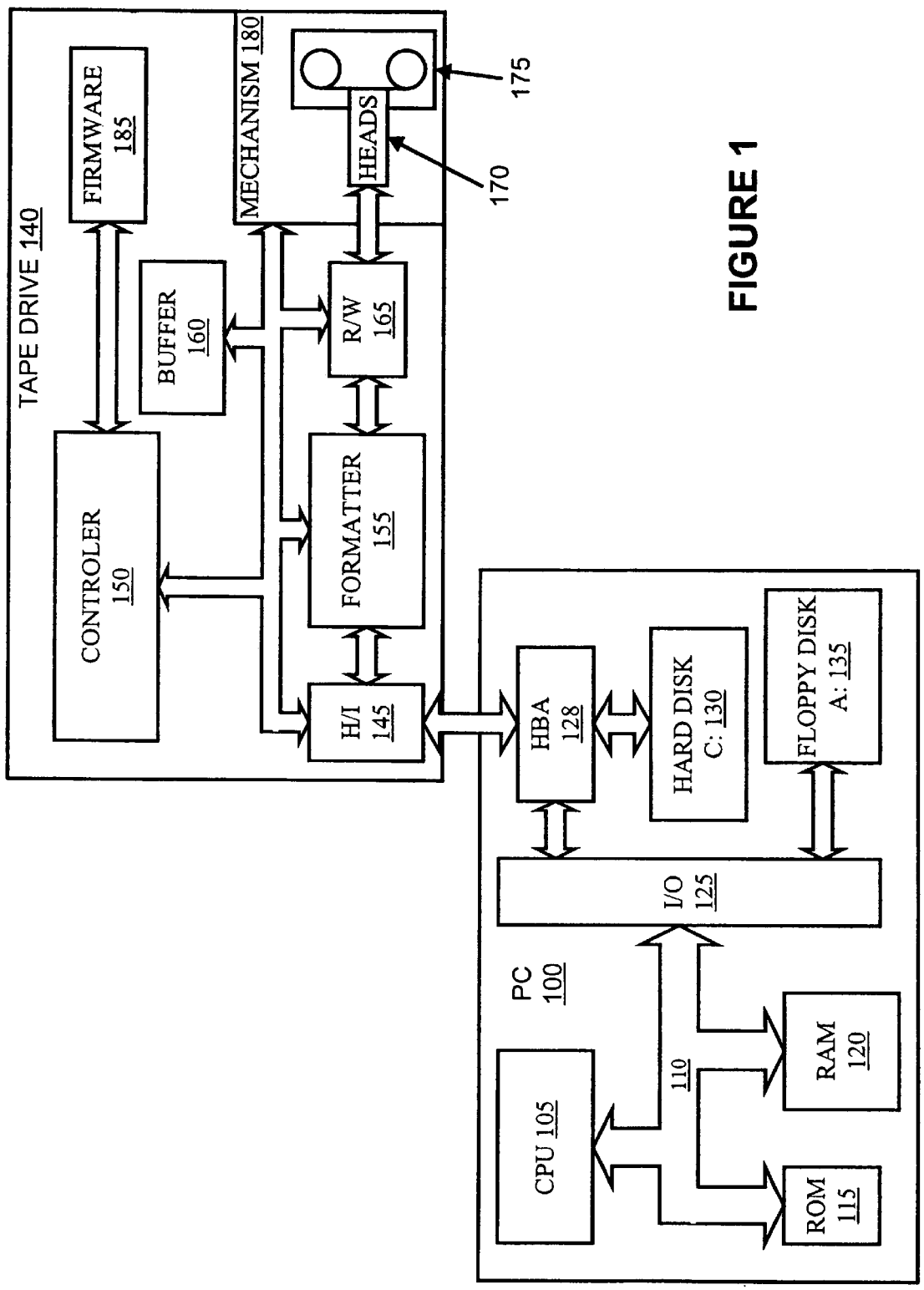
FIG. 1 is a high-level schematic block diagram showing a computer and a tape drive.

FIG. 1 is a block diagram, which illustrates a PC 100 connected to a standard tape drive 140, which has been modified as will be described below. In particular, the diagram illustrates the basic components of the PC 100 and the tape drive 140. The PC 100 is either an MS-DOS based machine, or a Windows NT or Windows 95/98 machine.

The tape drive 140 is, for example, a well-known DDS (Digital Data Storage) tape drive, DLT (Digital Linear Tape) tape drive or other tape media device.

As shown very simplistically in FIG. 1, the PC 100 includes a CPU 105 (Central Processing Unit), which is in communication, via a bus 110, with ROM 115 (Read Only Memory), RAM 120 (Random Access Memory) and an I/O (Input/Output) subsystem 125.

The I/O subsystem 125 connects the PC 100 to a number of storage devices, namely, a floppy disk drive 135 and, via a SCSI HBA 128, a hard disk drive 130 and the tape drive 140. The hard disk drive 130 and floppy disk drive 135 are represented as internal devices of the PC 100, whereas the tape drive 140 is represented as an external device, in this arrangement, although it could alternatively be an internal device.

In practice, the bus 110 may comprise multiple busses and respective bus subsystems; for example, host bus, PCI bus, EISA bus, X bus, Y bus etc. However, these are well-documented elsewhere and have not been illustrated for reasons of brevity of description only. Additionally, the I/O subsystem in a typical PC will generally also comprise one or more serial ports, parallel ports, video ports, mouse ports and respective subsystems or adaptors, none of which are shown for reasons of simplicity only. For more detailed information relating to typical PC hardware architectures, including details of PC bus and I/O system architectures, the reader is referred to the book "The Indispensable PC Hardware Handbook", third Edition, by Hans-Peter Messmer, published by Addison-Wesley ISBN 0-201-403994.

As also shown in FIG. 1, a typical tape drive 140 includes a host interface 145 for controlling transfer of data between the tape drive 140 and the PC 100. Control signals received from the PC 100 are passed to a controller 150, which controls the operation of all components of the tape drive 140. The controller 150 typically comprises a microprocessor, for example a Motorola 68000 series microprocessor, a micro-controller (as illustrated in the present embodiment) controlled by firmware stored in ROM 185, or an ASIC (application specific integrated circuit).

For a data backup operation, in response to receipt by the host interface 145 of data write signals from the PC, the controller 150 controls the tape drive 140 to write data to tape, comprising the steps: the host interface 145 receiving data from the PC 100 and passing it to the formatter 155; the formatter formatting the data, for example by compressing the data and adding error correction and detection codes, and storing the formatted data in a buffer 160, comprising, for example, a bank of 8 Mbytes of RAM; when appropriate (for example, when the buffer is nearly full), a read/write block reading the formatted data from the buffer 160 and converting the data into electrical signals suitable for driving magnetic read/write heads 170, which write the data to tape media 175 in known fashion. The tape media 175 is mounted in a tape mechanism 180, which loads and ejects the tape media 175 and winds the tape media 175 forwards or backwards as required for reading and writing data. In a DDS tape drive, the read/write heads 170 are mounted on a helical scanning drum, which rotates to sweep the heads past the tape in a motion oblique to the direction of travel of the tape.

For a data restore operation, in response to read signals received by the host interface 145 from the PC 100, the controller 150 controls the tape drive the return the data to the PC 100, comprising the steps: the heads 170 reading data signals from the tape media 175; the read/write block 165 converting the signals into digital data representation and storing the data in the buffer 160; the formatter 155 reading the data from the buffer 160, processing the data to remove errors and decompressing the data to be passed on to the host interface 145; and the host interface returning the data to the PC 100.

The host interface 145, formatter 155 and read/write blocks typically each comprise one or more appropriately programmed ASICs.

In the present embodiment, the PC 100 communicates with the tape drive 140 using one of the well-known standard SCSI protocols, such as SCS12. Accordingly, the host interface 145 comprises an appropriate SCSI adaptor. A detailed description of the SCSI protocol will not be included herein, since it is well known and only peripheral to the understanding of the invention. Alternatively, other protocols such as EIDE or Fibre Channel, could be used.

In general, the PC 100 and tape drive 140 described above are standard and well-known pieces of apparatus, which will, thus, not be described in any more detail so as not to obscure the present invention.

For the purposes of the present embodiment, the tape drive 140 is modified only in respect of the program, or firmware 185, which controls the operation of the tape drive.

The firmware 185 may be modified by writing a new set of instructions to the existing ROM (if the ROM is an EEPROM) using a standard firmware update process, which is well known and will, thus, not be described herein.

Alternatively, the ROM may simply be replaced with one containing the new instructions. In this way, it is a relatively simple process to modify the behaviour of a standard tape drive 140.

In accordance with the present embodiment, the firmware 185 in the tape drive 140 is modified to provide both a 'Normal Mode' of operation, in which the tape drive 140 behaves as a tape drive 140, and a 'DR Mode' of operation, in which the tape drive 140 is arranged to emulate a CD-ROM drive. The CD-ROM drive emulation is achieved in part by configuring the tape drive 140 to identify itself to the PC 100 as a CD-ROM drive and also by modifying a SCSI command set in the tape drive 140 to emulate the SCSI command set of a CD-ROM drive. The specific details of the modified SCSI command set are provided near the end of the present description. With the ability to emulate a CD-ROM drive, the tape drive 140 can act as an IPLD, without the need to modify existing PC BIOS standards, PC hardware or PC operating systems.

Whether the tape drive 140 operates in Normal Mode or DR Mode in the present embodiment is determined by user selection. The user selection of mode may be performed without the need for any additional tape drive hardware, by using the tape drive Eject button; if the tape drive 140 is powered on with the Eject button held down, the DR Mode of operation is selected, otherwise the Normal Mode is selected. This selection function is achieved by modifying the tape drive's firmware 185 to check the status of the Eject button during a power-on self-tests sequence. Alternatively, DR Mode could be selected by holding the Eject button down for a long time period (such as five seconds), when the tape drive 140 is already powered on, by modifying the firmware 185 to check the length of the period the Eject button is held down to determine whether the operation is an eject or the user selecting DR Mode. Various other means for selecting mode could be employed, for example by providing a specific DR button or switch on the tape drive 140. However, the present implementation has the benefit of not requiring any physical modification to the tape drive 140.

Before describing the operation of the present embodiment in greater detail, by way of background only, the standard boot process of a PC will now be summarised.

In order for any PC 100 to function, it must follow program instructions. Typically, standard programs that run on a PC 100 are stored on a hard disk drive 130, and are loaded into RAM 120 to be processed by the CPU 105 when necessary. From the RAM 120, the CPU 105 can read the instructions of the respective program and execute them.

On power-up, or system reset, however, the RAM 120 in the PC is empty and there are no program instructions to follow. Therefore, a BIOS program is provided, which is written into ROM 115 and is responsible for starting the PC 100.

BIOS programs follow a uniform standard that was created, and has been developed over the years, by the computer industry, so that compliant CPUs always addresses the same place (e.g. FFFF0h) in ROM to find the start of a BIOS program. A CPU retrieves and begins executing its initial instructions from this ROM location.

Once initiated, the BIOS program begins the system boot sequence, which calls other programs, gets the operating system loaded, and prepares the PC 100 for normal use.

One of the first tasks of a boot sequence is a power-on self-test (POST). After the POST, the PC 100, under the control of the BIOS program, initialises boot devices such as the keyboard and VDU. One or more of these boot devices may have its own specific BIOS program, which is located and initialised by the main BIOS program. Typically, video drivers and SCSI adapters have their own BIOS programs held in ROM on their respective interface cards. Next, the BIOS program will cause the PC 100 to check the system's logical devices, such as LPT1 and COM1, and memory configuration. In due course, the BIOS program checks for an IPLD from which it can load and execute bootable data, which normally comprises the data, or files of an operating system.

The bootable data typically resides at a specific location on the hard disk drive 130, which is usually allocated with the drive letter "C:". Thus, normally, the PC's operating system is booted from the hard disk drive 130.

However, BIOS programs generally define (or can otherwise be configured) that a floppy disk drive 135, allocated with the drive letter "A:", is accessed, before the hard disc drive 130, to determine whether it is loaded with a floppy disk containing bootable data. In this way, it is possible to boot the PC 100 from a floppy disk irrespective of whether the hard disk drive 130 contains bootable data, or is in a state where it can be accessed at all. This is the main reason why DR floppy disks are the standard means for beginning a DR procedure.

Once the BIOS has located an IPLD containing bootable data, it locates and loads into RAM one or more specific files which comprise executable programs, and executes them thereby transferring control of the PC to them. The programs typically load and initialise the remainder of the operating system, for example by partitioning disk drives, configuring device drivers etc. The programs may in addition be configured to load and execute application programs which are not part to the operating system, thereby passing control of the PC directly to the application programs without requiring user intervention. Such programs are sometimes known as auto-executing applications. In principle, such applications could be loaded directly into memory and executed. However, in practice, such programs tend to be copied onto the hard disk, from where they can be executed as required. Once the firmware 185 in the tape drive 140 has been configured to provide the two modes of operation—'Normal Mode' and 'DR Mode', which provides CD-ROM drive emulation—it is necessary to generate a bootable CD-ROM image on the tape media 175, for the tape drive 140 to use during DR.

In accordance with the present embodiment, a bootable CD-ROM image, or DR CD-ROM image, is stored in a pre-defined location on the tape media 175. The CD-ROM image contains an entry that identifies the image as being 'bootable'. The image itself is generated by the backup application software that originally created the backup tape media 175, as will be described in more detail below.

Figure 2:
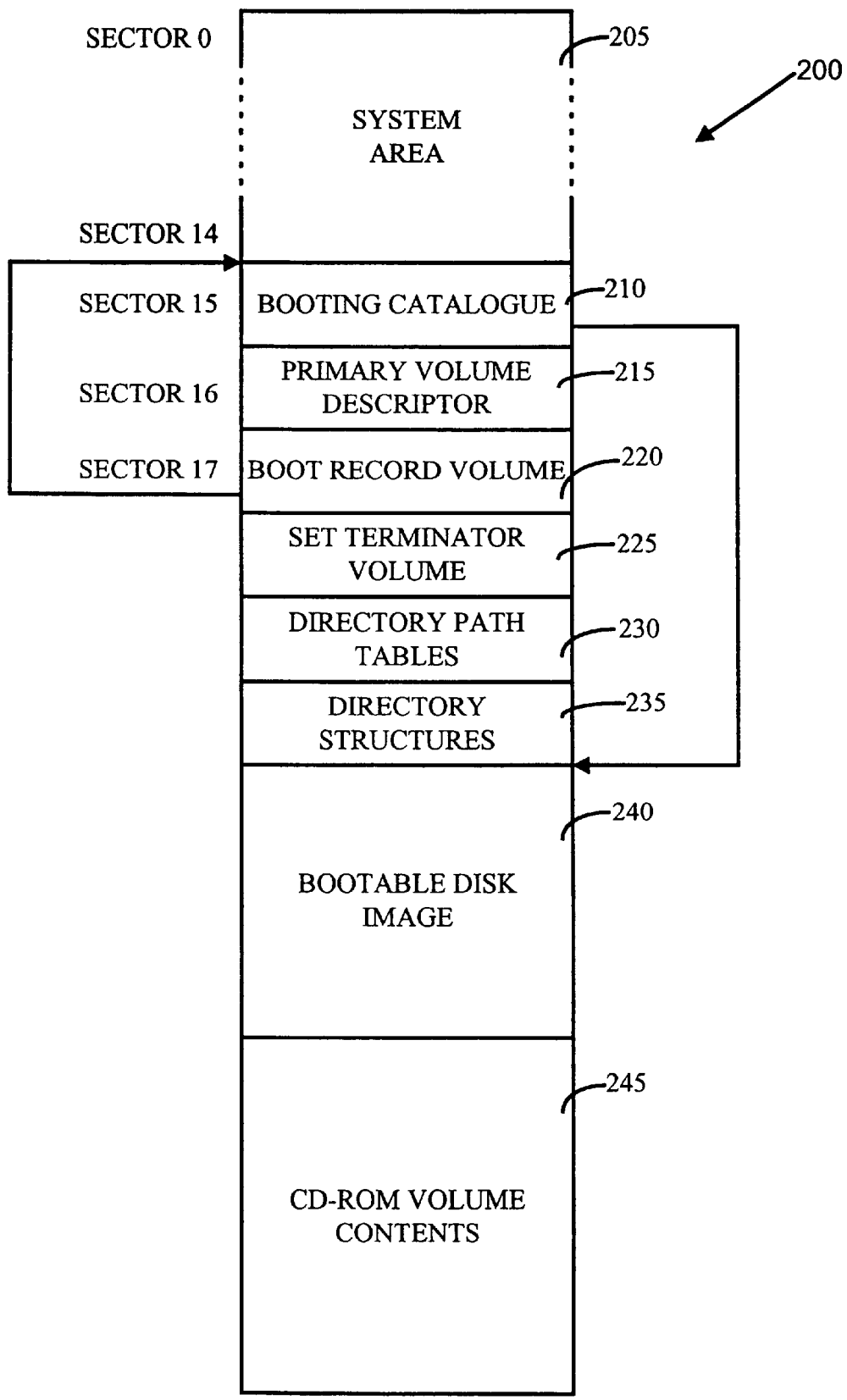
FIG. 2 is a diagram representing the high-level logical arrangement of data comprising a CD-ROM file system.

FIG. 2 illustrates the format of a bootable CD-ROM image 200 according to the El Torito specification and the ISO 9660 standard. For convenience, the basic arrangement of the format standard will now be summarised. As defined by the ISO, the first sixteen CD-ROM sectors, noting that those are 2 Kbyte sectors, are designated as the System Area 205. The System Area 205 may be utilised as desired by a manufacturer for its own purposes. Therefore this is a non-standard area and can be developed as desired. It is particularly noted that conventional CD-ROM development systems allow the manufacturer the capability to provide information into this entire area. In accordance with the present embodiment, sector 15 of the System Area 205 has been used as a Booting Catalogue 210. The Booting Catalogue 210 includes a pointer to a Bootable Disk Image 240. According to the ISO standard, at sector 16 (the 17$^{th}$ sector) a block called the Primary Volume Descriptor block 215 is located. The Primary Volume Descriptor 215 contains information about the CD-ROM and the data on it. A value in the Primary Volume Descriptor 215 indicates the size of the primary volume space contained on the particular CD-ROM, this being referred to as the volume size. Next, sector 17 (the 18$^{th}$ sector) is the El Torito-specified Boot Record Volume 220, which includes a pointer to the Booting Catalogue 210. The next sector is defined to be the Set Terminator Volume 225. This sector provides certain information which indicates that the various other blocks in the volume descriptor set used for providing information are terminating and that the primary volume space is to commence. Following the Set Terminator Volume 225, in the primary volume space, are sectors containing Directory Path Tables 230 and Directory Structures 235. Next comes the Bootable Disk Image 240, pointed to by the Booting Catalogue 210, which is in effect data from which a computer system can actually boot. This may be a floppy disk image, a hard disk image, or even appropriate raw data (in NO EMULATION mode). Finally comes the CD-ROM Volume Contents 245, for example the application software files.

The contents of the CD-ROM image, which complies with ISO 9660 and the El Torito specification will now be reviewed in more detail with reference to Tables 1–4.

Table 1 shows the contents of the Boot Record Volume 220. In particular, as shown in Table 1, a Boot Record Volume 220 includes, in byte offset 7–26, the text "EL TORITO SPECIFICATION" padded with zeros. As will be described, it is this part of the CD-ROM image that, when encountered, indicates to the tape drive 140 that the tape media is DR media according to the present embodiment.

TABLE 1

| Offset | Type | Description |
|---|---|---|
| 0 | byte | Boot Record Indicator, must be 0 |
| 1–5 | byte | ISO-9660 Identifier, must be "CD001" |
| 6 | byte | Version of this descriptor, must be 1 |
| 7–26 | byte | Boot System identifier, must be "EL TORITO SPECIFICATION" padded with 0's. |
| 27–46 | byte | Unused, must be 0 |
| 47–4A | Dword | Must be 0 × 0F (Absolute pointer to first sector of Booting Catalogue) |
| 4A–7FF | byte | Unused, must be 0 |

The Booting Catalogue 210 forms part of the CD-ROM image in a location indicated by a pointer in bytes 47–4A of the Boot Record Volume 220. The Booting Catalogue 210 contains firstly a Validation Entry that indicates that a Booting Catalogue is present, followed by an Initial/Default entry that describes the form of the bootable image. As already mentioned, the Booting Catalogue 210 is held in a single hitherto unused sector in a fixed location, namely sector 0x0F, although it could be in any other available sector if desired. The formats for the Validation Entry and Initial/Default entry, respectively in Tables 2 and 3, are:

TABLE 2

| Offset | Type | Description |
|---|---|---|
| 0 | byte | Header ID, must be 01 |
| 1 | byte | Platform ID: 0 = 80 × 86, 1 = PowerPC, 2 = Mac |

TABLE 2-continued

| Offset | Type | Description |
|---|---|---|
| 2–3 | Word | Reserved, must be 0 |
| 4–1B | Character | ID string, must be "DR-1.0" padded with 0's |
| 1C–1D | Integer | Checksum Word. This sum of all the words in this record should be 0. |
| 1E | byte | Key byte, must be 55 (value is included in checksum) |
| 1F | byte | Key byte, must be M (value is included in checksum) |

TABLE 3

| Offset | Type | Description |
|---|---|---|
| 0 | byte | Boot indicator. 88 = Bootable, 00 = Not Bootable |
| 1 | byte | Boot media type. This specifies what media the boot image is intended to emulate in bits 0–3 as follows, bits 4–7 are reserved and must be 0. Bits 0–3 are as follows:<br>0 No Emulation<br>1 1.2 meg diskette<br>2 1.44 meg diskette<br>3 2.88 meg diskette<br>4 Hard Disk (drive 80) |
| 2–3 | Word | Load Segment. This is the load segment for the initial boot image. This value should be set to 0 so that the system will use the traditional load segment of 7C0. |
| 4 | byte | System Type. This must be a copy of byte 5 (System Type) from the Partition Table found in the boot image. This will normally be set to 0 (80 × 86 type) |
| 5 | byte | Unused, must be 0 |
| 6–7 | Word | Sector Count. This is the number of virtual/emulated 512-byte sectors the system will store at Load Segment during the initial boot procedure. For disk emulation this value is normally set to 1. |
| 8–0B | DWord | Load RBA. This contains the CD sector that is the start address of the bootable disk image. |
| 0C–1F | byte | Unused, must be 0 |

Depending on the value set for Boot Media Type, the bootable disk image consists of an exact replica of the floppy or hard disk the system is intended to emulate. This image is created by concatenating all the blocks that make up the source media into a file. It is the responsibility of INT 13 (DOS interrupt 13) to interface to recreate the disk geometry and to properly access the information. When NO EMULATION is used for the Boot Media Type, then this is simply a "loader" or stand-alone program. The specified number of sectors are loaded at the specified segment (usually 7C0), and then the BIOS jumps to the load address.

The Bootable Disk Image file 240 is placed in ISO-9660 format as the first file in the root directory of the CD Volume. The standard ISO-9660 Directory Path Table 230 and directory entry table are built to take this extra file in the volume into account. Note that if NO EMULATION mode is being used, and the Bootable Disk Image is 15 sectors or less in size, then it could be placed in the unused System Area at the beginning of the CD image, thus avoiding having to make it a file in the CD volume and saving some space.

ISO 9660 data structures fall into three main categories: the Volume Descriptors, the Directory Structures, and the Path Tables. The Volume Descriptor indicates where the Directory Structure 235 and the Path Table 230 are located, the Directory Structure 235 indicates where the actual files are located, and the Path Table 230 provides short cuts to each directory. The CD-ROM image is made up of the Path Table, the Directory Structures and of course the actual files (including the bootable disk image file). As illustrated in Table 4, the Primary Volume descriptor must contain at least the following information:

TABLE 4

| | |
|---|---|
| Standard Identifier | ISO-9660 Identifier, must be "CD001" |
| Volume Identifier | String describing CD contents |
| System Identifier | Unused, set to 0 |
| Volume Size | Number of Logical Blocks in this Volume |
| Number of Volumes in this Set | 1 |
| Number of this Volume in the Set | 1 |
| Logical Block Size | 2048 |
| Size of the Path Table | How many bytes are in the Path Table |
| Location of the Path Table | Location in the CD-ROM of the Volume Path Table |
| Root Directory Record | Contains the information needed to locate and read the top level directory, formatted as a directory record |
| Time Stamps | Information about when the Volume was created, etc |

The ISO 9660 specification contains full details on the Primary and Set Terminator Volume Descriptors, the Path Table, and the Directory Structures. The actual files are written to the CD image at the sector locations specified in the Directory Structures (note that each file starts on a new sector).

According to the present embodiment, for the purposes of generating DR-capable tape media, the backup application software is arranged to add the CD-ROM image (as described above) onto the tape media 175 each time a backup operation that overwrites the media is enacted, if the tape drive 140 is DR capable. One method of achieving this is by writing the CD-ROM image to the tape media 175 in the specified location as part of a standard tape format operation (which is performed each time a backup that overwrites the media is done).

Additionally, or alternatively, it is believed to be advantageous for the backup application software to provide a user option to add the CD-ROM image, even when the tape drive 140 is not DR capable, so that the resulting tape media 175 could still be used in a DR-capable drive. One method for the backup application software to detect the DR capability of a tape drive 140 is to check for the presence of a new SCSI Mode page for DR control, which is described below.

The CD-ROM image reflects the current PC configuration in terms of installed hardware devices, for example SCSI HBA 128. In other words, the equivalent of an up-to-date set of DR floppy disks is created automatically each time the PC 100 is backed up, which may be as frequently as on a daily basis. Therefore, the chance of there only being in existence out of date DR media is greatly reduced.

Preferably, the initial DR CD-ROM image is created by the application software as a standard file. This DR CD-ROM image file contains an exact image of bootable CD-ROM media, which complies with the ISO 9660 specification and the El-Torito bootable CD-ROM specification.

The contents of the bootable CD-ROM include a minimum operating system plus minimum backup application software, such that the system data can be restored from the backup tape after booting from the CD-ROM image. Essentially, the CD-ROM image contains the same contents as the current floppy-based DR software solutions, except for the following modifications:

ability to run from a bootable CD-ROM structure (instead of multiple floppy disks);

any hard-coded device type dependencies (e.g. floppy/CD paths) are removed; and the random-access performance characteristics of the CD-ROM should most preferably (although not necessarily) be optimised for sequential use on the tape drive to ensure that the maximum seek time between file accesses is 10 seconds, as described below.

Figure 3A:
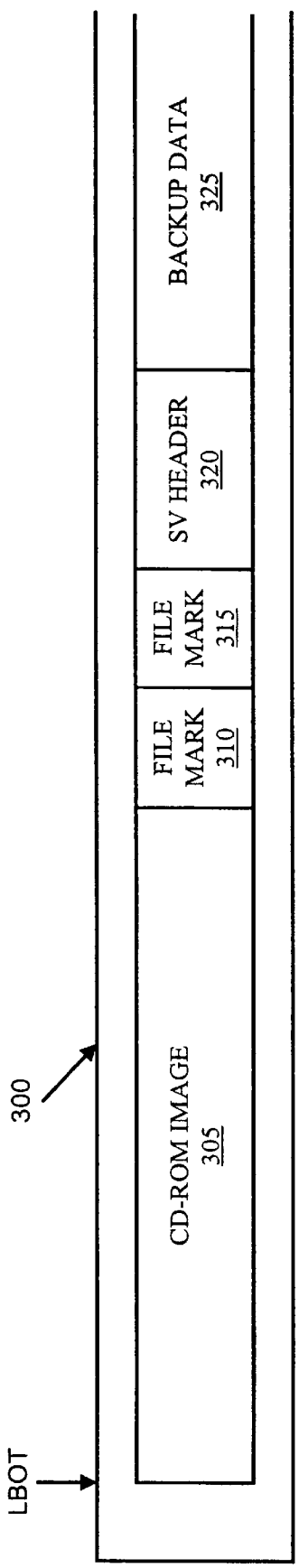
FIGS. 3a and 3b are diagrams representing the high-level logical arrangements of two exemplary DR data formats on tape.

The diagram in FIG. 3a illustrates one possible location for a CD-ROM image 305 at the beginning of a length 300 of tape media 175. The CD-ROM image 305 is followed by two filemarks, 310 and 315, an application software vendor (SV) header 320, which identifies that the media has been generated by particular backup application software, and finally, the backup data 325 itself.

However, given that known backup application software generally uses the first few blocks of data on the tape media 175 for an SV header, the above scheme would mean that the new DR-capable backup tape media 175 would not be recognised by previous versions of the application software. Therefore, the present inventors have determined that the scheme depicted in FIG. 3b is more preferable, as it supports backwards compatibility with previous versions of backup application software.

Figure 3B:
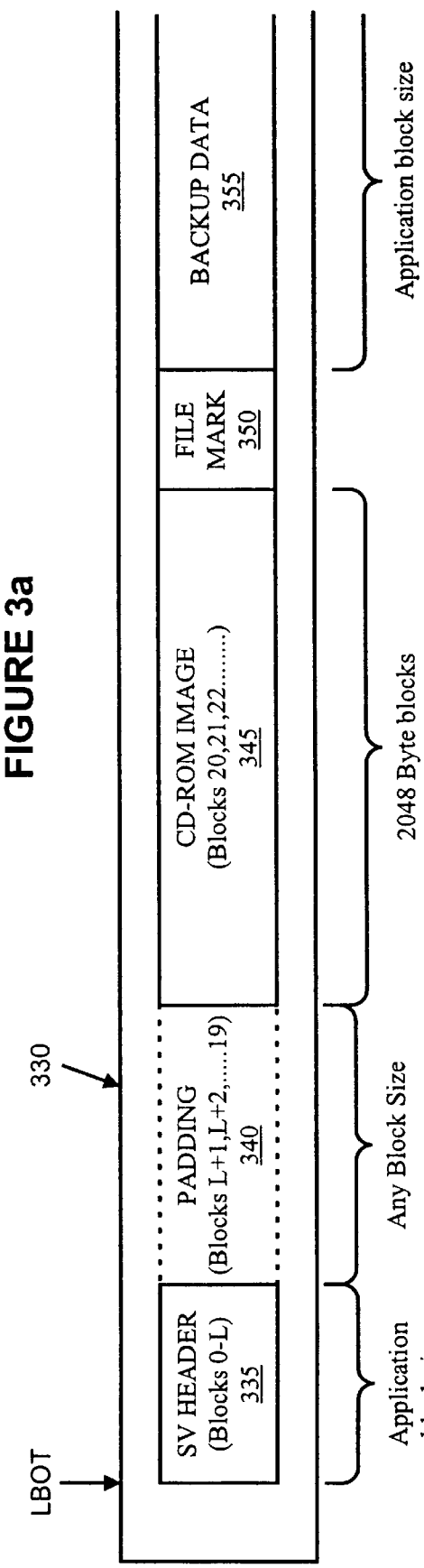

In FIG. 3b, the first few blocks of data on a length 330 of tape media 175 are a standard SV header 335 (with application software sized blocks), followed by multiple blank blocks 340 (of any block size) to pad the application header 335 out to a predefined size of 20 blocks (0–19), and then by the CD-ROM image 345 (of 2048 byte block size), followed by a filemark 350, and, finally, the backup data set 355 (of application software block size). This arrangement determines that the CD-ROM image 345 always starts in the $21^{st}$ block from LBOT (the Logical Beginning Of Tape), and thus is very easy for the tape drive 140 to locate.

Figure 4:
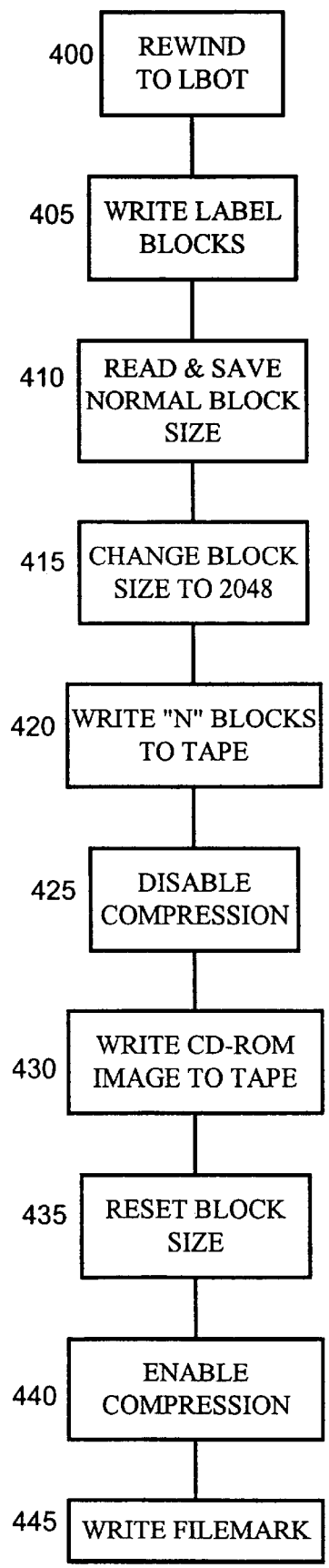
FIG. 4 is a flow diagram illustrating the steps involved in writing a DR file system to tape media.

With reference to FIG. 4, there will now be described a method of writing the entire DR image file to tape media 175 in a fixed location in the format illustrated by FIG. 3b.

In step 400, the tape media 175 is rewound to LBOT. Then, in step 405, the normal application software label blocks 335 are written to the tape media 175 with the standard application software block sizes. In step 410, the application software normal fixed block size is read using a Mode Sense command, and the value is saved. Then, in step 415, the fixed block size is changed to 2048 bytes using a Mode Select command. In step 420, "N" null blocks 340 of data are written to the tape media 175 using fixed block mode write until the specified start location of the CD-ROM image, where:

N=(20−number of application label blocks)

Next, in step 425, any hardware compression is disabled using an appropriate SCSI Mode Select command (this is optional, since the image could be written as either compressed or uncompressed data). Then, in step 430, the CD-ROM image 345 is written to the tape media 175 with fixed block mode write. In step 435, the current fixed block size is changed back to the original application block size, and, in step 440, hardware compression (if applicable) is re-enabled using appropriate SCSI Mode Select commands. Finally, a filemark 350 is written to tape.

The resulting tape format will not interfere with backwards compatibility of the backup tape with previous versions of the application software, since the CD-ROM image data after that application label should never be accessed by previous versions.

If the PC configuration changes such that the current DR image file needs updating, then, preferably, DR image file updates should be applied without needing to re-create the entire DR image file. Such updates may be due to hardware changes (e.g. new SCSI HBAs) or operating system partition/volume changes. Then, the updates to the DR image file are written to the tape by overwriting only the old parts of the image file.

If the DR image file has been updated but subsequent backup operations are appending to the backup media rather than overwriting, then an error message should be generated by the application software, warning the user that their current backup media does not include the latest DR updates and that a full backup with overwrite is recommended.

Figure 5:
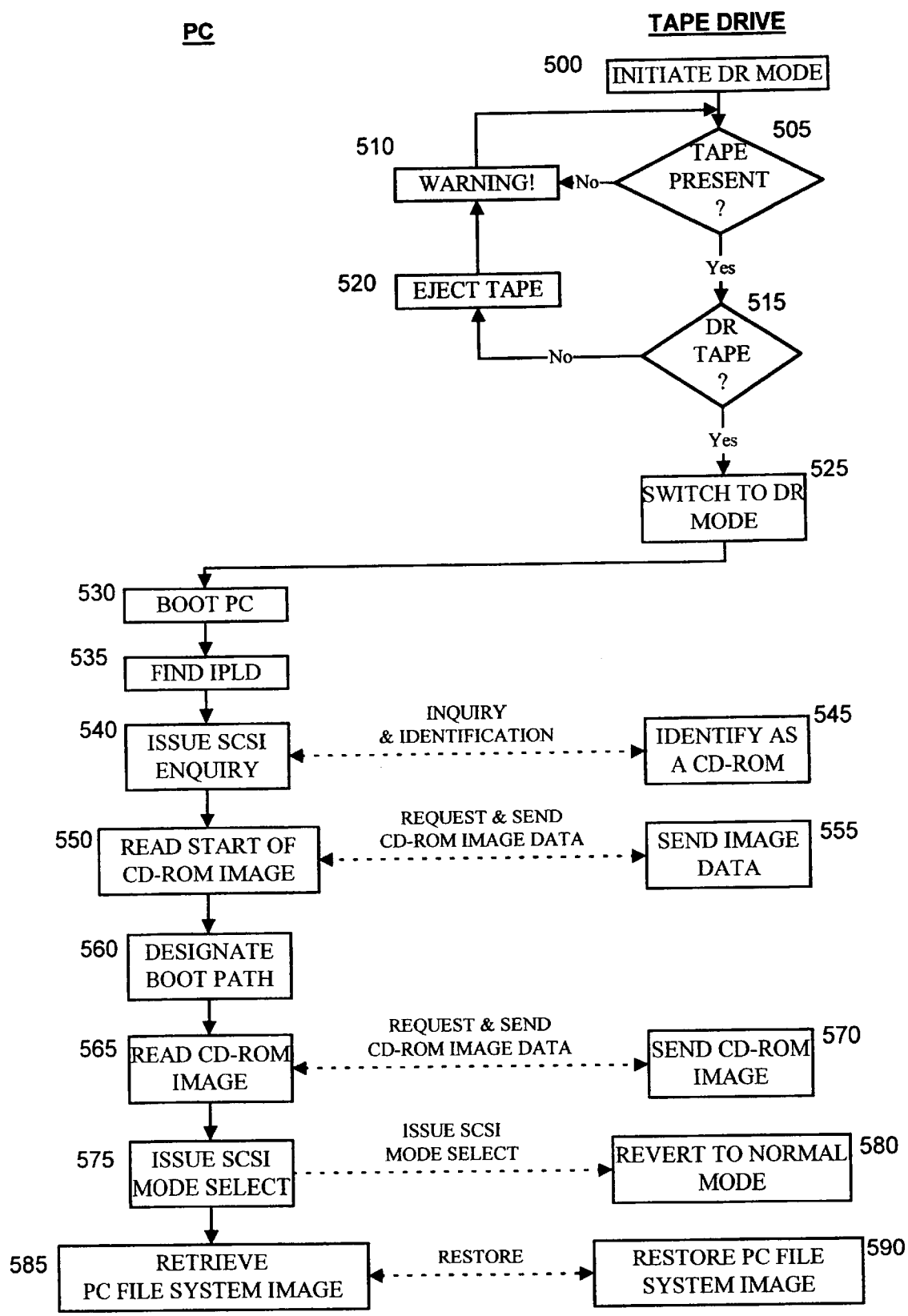
FIG. 5 is a flow diagram illustrating the steps involved in setting a tape drive into 'DR Mode' and booting a computer from the tape drive.

A DR operation will now be described in more detail with reference to the flow diagram in FIG. 5. In FIG. 5, the solid lines represent the primary process flow and the broken lines represent interactions between the PC 100 and the tape drive 140.

According to FIG. 5, in step 500, a user initiates DR Mode in the tape drive 140 by holding down the Eject button when the power is switched on. As a result, the tape drive 140 displays an appropriate signal on the front panel (not shown) of the tape drive; for example, by setting one or more front panel LEDs to flash or generating a graphical message on an LCD display. The tape drive 140 then continues as follows.

In step 505, the tape drive 140 determines whether tape media 175 is present in the tape drive 140 in normal fashion, and generates an appropriate warning signal to the user if not, in step 510. While waiting for the media to be loaded and while checking the media for DR capability, the tape drive 140 is arranged to respond to a Test Unit Ready command from the PC 100 by returning "CHECK CONDITION", with sense key 'NOT READY' (0×02) and extended sense 'LOADING' (0×0401). This in fact may be a false response, which is intended to trick the BIOS into waiting for the tape to load (if it has not done so already), which can take up to thirty seconds after being inserted into the tape drive after power-on. In this case, if a true response were returned before a tape had been loaded (a true response including extended sense 'MEDIA NOT LOADED'), the BIOS would move straight on from the tape drive in an attempt to find a different IPLD. In other words, DR would not work. The false response causes the BIOS to wait at least 60 seconds before timing out after waiting for the tape drive (which is emulating a CD-ROM drive) to read the first block. This time is sufficient for the tape media to be inserted, loaded and checked for DR capability. The ability to generate a false response is a key requirement of tape drive operation when the tape drive 140 is an 'internal' tape drive, which shares the power of the PC. In the absence of this feature, it is highly likely that an 'internal' tape drive would not be able to provide the DR Mode. Obviously, the feature is not such an issue with an 'external' tape drive, which has its own power supply and can be switched on and prepared in advance of switching the PC on.

If, or once, tape media 175 is loaded by the user, in step 515, the firmware 185 controls the tape drive 140 to check to see if the tape media 175 is valid DR tape media. This is achieved by rewinding the tape media 175 to LBOT, reading from the beginning of the tape media 175 and searching for an appropriate Boot System Identifier entry in a Boot Record Volume Description of a CD-ROM image. For the purposes of the present embodiment, the tape drive Locates from LBOT to block 37, and bytes 0×7 to 0×26 must be "EL TORITO SPECIFICATION" padded with 0's. In addition, the tape drive firmware 185 determines whether the image was written with 2048 byte blocks, by Locating to block 20 (from LBOT) and reading 2048 bytes. If no Illegal Length Indicator (ILI) is generated, then the DR image is written in 2048 byte blocks.

If the tape media 175 is found to be DR media then, in step 525, the tape drive 140 switches to DR Mode by enabling the appropriate CD-ROM SCSI command set and displaying an appropriate DR Mode signal on the front panel. Otherwise, in step 520, the tape drive 140 ejects the tape media 175 and another appropriate warning signal is provided via the front panel display, in step 510.

The tape drive 140 remains in "DR Mode" until one of the following conditions are met: tape drive 140 is power cycled; backup application software sends a DR Mode page command to disable DR Mode; user manually ejects the loaded DR capable media; or, the tape drive 140 receives a SCSI bus rest after 100 CD-ROM blocks or more have been read while in DR Mode.

When exiting "DR Mode", the emulated CD-ROM SCSI commands are disabled and the tape drive 140 reverts to Normal Mode; the tape drive 140 then appears to be in the same state as if it had just been powered on.

In step 530, the PC 100 is booted and carries out the steps defined by the BIOS program, as described above. In particular, in step 535, the PC 100 searches for an IPLD, which contains a bootable file system. The typical BIOS boot sequence is:

1. Search for a floppy disk drive containing a bootable floppy disc—if found, then attempt to boot from this, otherwise
2. Search for a CD-ROM drive containing bootable CD-ROM media—if found, then attempt to boot from this, otherwise
3. If no bootable floppy disk or CD-ROM drive is found, then attempt to boot from hard disk drive.

Assuming no other IPLDs containing bootable data are found, the PC 100 accesses the tape drive 140, in step 540, and issues a SCSI "INQUIRY". In response, in step 545, the tape drive 140, operating in DR Mode, returns a Standard Inquiry Data CDB (Control Data Block) having a Peripheral Device Type value of 5 (CD-ROM device type) rather than 1 (tape drive device type), which identifies the tape drive 140 as a CD-ROM drive. In addition, the Standard Inquiry Data includes a signature string, for example "DR-1.0", which indicates to the application software (when installed and running) that the tape drive is DR-capable, and also indicates what version of DR firmware is present. Then, in step 550, the PC 100 reads the beginning of the CD-ROM image from the tape drive 140 to check for a bootable CD-ROM file system, and, when returned by the tape drive 140 in step 555, the PC 100 designates the tape drive 140 as the boot path in step 560.

This means that the PC 100 will boot from the CD-ROM image in the tape drive 140 path, even if there are other, real CD-ROM drive devices present in the system (as long as they do not contain a bootable CD-ROM). The only other requirement for the present DR operation to function is that the PC BIOS, or SCSI host adaptor BIOS, supports bootable CD-ROM drives (which is typically the case in all modern SCSI host adaptor cards or motherboard chipsets).

In step 565, the PC 100 reads the CD-ROM image, which is returned by the tape drive 140 in step 570. The operating system files are read directly into RAM 120 and are executed by the CPU 105 in order to configure the PC, including to be able to access a tape drive 140. The backup application software files are read and stored on the hard disk, from where they can be executed.

Next, in step 575, the PC 100 executes the backup application software for DR and issues a SCSI Mode Select command that accesses the DR Mode page of the tape drive to terminate DR Mode and begin Normal Mode, to continue with normal tape drive operation.

In step 580, the tape drive 140 reverts to Normal Mode, the buffer 160 is purged and the tape media 175 is allowed to be physically accessed by standard tape drive commands (i.e. Locate, Space, Read etc.). This allows the PC's recovery to proceed as if it had initially booted from DR floppy disk.

Finally, in step 585, the PC 100 continues to retrieve from the tape drive 140 the backed up data set stored on tape media 175 until the whole PC 100 file system is restored to hard disk drive 130. Thereafter, the re-built PC 100 can boot from the hard disk drive 130 as normal.

When operating in DR Mode, the tape drive 140 needs to emulate a CD-ROM drive, which is a random access device. However, the tape drive 140 is a sequential access device. This raises a number of issues. For example, a tape drive will typically not be able locate specific chunks of data in different places on the media as quickly as a random access device can. Also, there is a potential problem of tape wear, if the tape drive is repeatedly reading the same sections of tape to locate certain data.

The present inventors have addressed these issues by taking two significant steps to reduce both tape wear and data locate times.

The first step requires specific data from the CD-ROM image to be initially cached in the buffer memory 160, and the second step requires the files that make up the CD-ROM image to be ordered so that they may be accessed in as sequential a fashion as possible, in order to optimise the performance of the tape drive.

With regards to caching, since the largest currently available bootable DR floppy disk set known to the inventors consists of four floppy disks, holding approximately 6 Mbytes of data, an entire CD-ROM image would fit into an 8 Mbyte buffer. However, many tape drives do not have 8 Mbytes of buffer memory (they usually only have 1–2 Mbytes), or, generally, the buffer size may be less than the size of the CD-ROM image. Therefore, such drives need to access the tape media more than once in response to CD-ROM image access commands (Seek, Read).

However, in accordance with the present embodiment, the tape drive is arranged to read a permanent (i.e. permanent during DR Mode at least) cache of at least 123 blocks of CD-ROM image into the memory buffer 160 at the time when the media is being checked for DR capability. Thus, the tape drive does not need to re-access this area of the CD-ROM image on tape while in DR Mode. These 123 blocks represent the CD-ROM directory entry area for approximately 6000 files. As a result of this, as each file is read by the PC, the tape drive does not need to re-access the directory from the tape. Instead, the tape drive is arranged to read the directory from the cache to discover where on tape the required file is.

In addition, as many as possible of the files in the CD-ROM image that need to be accessed by the tape drive more than once, for example SCSI drivers, are written into the permanent cache. Clearly, the number depends upon the size of the available cache. In order to achieve this easily, the files that need to be accessed more than once are arranged by the application software to be stored near the front of the CD-ROM image, directly after the directory blocks.

Typically, in a CD-ROM drive, since the act of Locating files in different places on a CD-ROM generates minimum overhead, files may be ordered in an arbitrary way, for example alphabetically or in terms of the directory order. The inventors have appreciated that this arbitrary arrangement would generate an undesirable overhead for Locating the same files on tape media.

Therefore, the files on tape are ordered by the application software to be as much as possible in the order in which they need to be accessed by the application software during a DR operation. Thus, the requirement for tape Locate operations is minimised, thereby reducing the overhead as much as possible.

By way of example, there will now be described an optimal arrangement of files in a CD-ROM image for the Windows™ NT operating system. The example makes the following key assumptions about the TXTSETUP.SIF file used in disaster recovery:

The [SourceDisksFiles] and [SourceDisksFiles.x86] sections are merged into a single [SourceDisksFiles] section; and Any additional SCSI HBA device drivers (e.g. RAID, U2W, etc) are loaded BEFORE the standard set.

| | |
|---|---|
| NTDETECT.COM | These initial files are used twice so are put inside the 246KB permanent CD cache. |
| VGAOEM.FON | |
| ATAPI.SYS | |
| 18042PRT.SYS | |
| VGA.SYS | |
| L_INTL.NLS | |
| FLOPPY.SYS | |
| DISK.SYS | |
| CLASS2.SYS | |
| SETUPLDR.BIN | These files are needed to load NT SETUP. |
| TXTSETUP.SIF | |
| NTKRNLMP.EXE | |
| HAL486C.DLL | |
| HALAPIC.DLL | |
| HALNCR.DLL | |
| SETUPREG.HIV | |
| C_1252.NLS | Note the '.NLS' files are different for different languages, so the correct NLS files for the language must be placed here. |
| C_437.NLS | |
| SETUPDD.SYS | |
| SPDDLANG.SYS | |
| PCMCIA.SYS | |
| SCSIPORT.SYS | |
| | Any additional SCSI HBA drivers are inserted here in the file order. since they are loaded before the standard set. |
| CPQARRAY.SYS | |
| DELLDSA.SYS | |
| NCR53C9X.SYS | |
| SPOCK.SYS | |
| OLISCSI.SYS | |
| NCRC700.SYS | |
| NCRC710.SYS | |
| AHA154X.SYS | |
| SPARROW.SYS | |
| AHA174X.SYS | |
| DPTSCSI.SYS | |
| ULTRA14F.SYS | |
| ULTRA24F.SYS | |
| AMI0NT.SYS | |
| FD7000EX.SYS | |
| FD8XX.SYS | |
| FD16_700.SYS | |
| ARROW.SYS | |
| SYMC810.SYS | |
| BUSLOGIC.SYS | |
| SLCD32.SYS | |
| AIC78XX.SYS | |
| DAC960NT.SYS | |
| QL10WNT.SYS | |
| AMSINT.SYS | |
| FLASHPNT.SYS | |
| CPQFWS2E.SYS | |
| ATDISK.SYS | |
| ABIOSDSK.SYS | |
| FASTFAT.SYS | |
| NTFS.SYS | |
| VIDEOPRT.SYS | |

-continued

```
CDROM.SYS
SFLOPPY.SYS
KBDCLASS.SYS
CDFS.SYS
SYSTEM32\NTDLL.DLL
SYSTEM32\SMSS.EXE
KBDUS.DLL
SETUPP.INI
MOUCLASS.SY_
XGA.DL_              Video driver files.
WEITEKP9.DL_
W32.DL_
TGA.DL_
S3.DL_
QV.DL_
MGA.DL_
ATI.DL_
8514A.DL_
XGA.SY_
WEITEKP9.SYS
WDVGA.SY_
V7VRAM.SY_
TGA.SYS
S3.SY_
QV.SY_
NCR77C22.SY_
MGA_MIL.SYS
MGA.SY_
ET4000.SY_
DELL_DGX.SY_
CIRRUS.SYS
ATI.SY_
FRAMEBUF.DL_
VGA64K.DL_
VGA256.DL_
HAL.DL_              Files required to load the NT kernel.
HALAST.DL_
HALMPS.DLL
HALOLI.DL_
HALSP.DL_
HALWYSE7.DL_
NTOSKRNL.EXE
NTLDR
```

The remaining NT files used in the DR are ordered alphabetically after this
point. They are ordered in the opposite direction to the list in
[SourceDisksFiles], e.g. if the TXTSETUP.SIF file is ordered A–Z then
the they are ordered Z–A in this section of the CD image.
Finally, the backup application DR files are ordered hereafter, again in the
opposite alphabetical direction to the TXTSETUP.SIF.

Generally, it will be appreciated that using a cache and ordering files as described above could be used by any system in which it is necessary to recover data from sequential storage on the basis of random access read commands.

In all cases, the tape drive 140 accesses the correct data on tape media by converting the logical block address of the CD-ROM drive access commands into a physical location on tape media. The positions on tape of a particular file are derived from the cached directory entry for the file. Location of a file on tape is dependent on the tape media being written using a fixed 2 Kbyte block size (i.e. 2048 bytes). Then, the conversion of a random-access command intended for a CD-ROM drive to a sequential tape media position is achieved by using a tape drive LOCATE to move to the X'th block down the tape media, where:

X=(CD image block offset from BOT)+(Block address requested in Seek/Read)

Tape drive performance may also be improved by reading as much data from tape as possible into any remaining space in the memory buffer 160 not used by the permanent cache, thereby using the memory buffer as a read-ahead cache for subsequent tape accesses.

Then, generally, if data requested by a CD-ROM read is not already cached in the buffer 160, the data is read from the tape media by using the standard tape drive LOCATE and READ functions. The LOCATE command is used to move the tape media to the required starting read block location, and then the READ command is used in fixed block mode to read the requested number of blocks from the tape into the buffer.

The new or modified commands required by the tape drive 140 to operate in accordance with the present embodiment now be described in more detail.

Test Unit Ready (TUR)

This command uses exactly the same CDB during Normal Mode, but it behaves differently during DR Mode:

if media is not already loaded when the drive is powered on in DR Mode then, while waiting for the first piece of media to be loaded, the TUR command returns 'CHECK CONDITION', with sense key 'NOT READY' (0x02) and extended sense 'LOADING' (0x0401); and while checking the first piece of loaded media for DR capability, the TUR command returns 'CHECK CONDITION', with sense key NOT READY (0x02) and extended sense LOADING (0x0401)

Inquiry

In both Normal and DR modes of operation, the Standard Inquiry Data page incorporates six extra bytes 43–8 to provide a signature and version number, namely "DR-1.0". The first three bytes are the signature that acts as identification for application software to check whether the device supports DR according to the present embodiment. The application software is arranged, thus, to check for the string "DR-1.0" in the tape drive's standard Inquiry Data. The version value is the last three byes. The byte 4 Additional Length value is also changed to accommodate the additional six bytes of inquiry data.

While in DR mode this command uses the same CDB as in Normal Mode and behaves in exactly the same way, except for the Peripheral Device Type bits in all of the supported Inquiry Data Pages. The Peripheral Device Type is set by byte 0, bits 0–4 of each Inquiry Data Page, and is changed from 1 (tape device type) to 5 (CD-ROM device type).

Request Sense

This command uses exactly the same CDB as Normal Mode and behaves in exactly the same way.

Start/Stop Unit

This command uses the same CDB as a standard tape drive 'LOAD'/'UNLOAD' command, except that the Load bit is ignored and the command always returns 'GOOD' status.

Mode Sense/Select

These commands are generally used for reading or setting any configuration options in a SCSI device via Mode Sense pages (each page represents a specific type of configuration data/options). According to the present embodiment, a new Mode Sense page is needed to control the operating mode of the tape drive, to allow switching from Normal Mode to DR Mode, and vice-versa. This allows the backup application software to switch the tape drive 140 from DR Mode back to Normal Mode when the backup application software is ready to start reading conventional backup data from the tape drive 140 and restoring it to the hard disk drive 130 of the PC 100.

The Mode page header values for "Medium type" and "Density code" need to comply with CD-ROM media, used by the DR operating system to determine the type of CD-ROM media present when it is preparing to copy data from the CD-ROM device to continue the boot sequence.

The Mode Parameter Header data that is used in Mode Sense and Mode Select commands is changed to include the CD-ROM device specific bits:

|   | 7 | 6 | 5 | 4 | 3 | 2 | 1 | 0 |
|---|---|---|---|---|---|---|---|---|
| 0 |   |   |   | Mode Data Length |   |   |   |   |
| 1 |   |   |   | Medium Type(0) |   |   |   |   |
| 2 | Reserved |   |   | Dpo-Fua(0) |   | Reserved |   | EBC(0) |
| 3 |   |   |   | Block Descriptor Length (0 or 8) |   |   |   |   |

The Mode Block Descriptor data differs from the tape drive mode only in that the Density Code byte is set to 0x01 and the Block Length is set to 2048 and unchangeable.

There is also a new Mode page to toggle the DR Mode operation, as follows:

|   | 7 | 6 | 5 | 4 | 3 | 2 | 1 | 0 |
|---|---|---|---|---|---|---|---|---|
| 0 |   |   |   | Page Code (0 × 3E) |   |   |   |   |
| 1 |   |   |   | Page Length (0 × 1) |   |   |   |   |
| 2 |   |   |   |   |   |   | DRauto(0) | DRmode |
| 3 |   |   |   | Reserved |   |   |   |   |

The 'DRmode' bit controls which mode of operation the tape drive 140 is operating in. When DRmode is set to zero, the tape drive 140 is switched back from DR Mode to Normal Mode. When DR Mode is set to one, the tape drive 140 attempts to initialise DR Mode as if the user had initiated the front-panel 'Eject' button DR sequence and returns "GOOD" status on success.

The DRauto bit controls whether the tape drive is automatically switched from DR Mode back to Normal Mode when receiving a SCSI Bus reset after at least 100 CD-ROM blocks have been read. When DRauto is set to zero (default), the automatic switch over is enabled, and when DRauto is set to 1 the automatic switch over is disabled.

Ready(10)/Read(6)

The CD-ROM Read(6) and Read(10) commands cause the tape drive 140 to read a fixed number of blocks from a Logical Block Address value representing the logical read start location rather than the current physical location on the tape. The Read(6) and Read(10) CDBs are as follows:

|   | 7 | 6 | 5 | 4 | 3 | 2 | 1 | 0 |
|---|---|---|---|---|---|---|---|---|
| 0 |   |   |   | Operation Code 0 × 08 |   |   |   |   |
| 1 | LUN(0) |   |   |   |   |   |   | (MSB) |
| 2 |   |   |   | Logical Block Address |   |   |   |   |
| 3 |   |   |   |   |   |   |   | (LSB) |
| 4 |   |   |   | Transfer Length |   |   |   |   |
| 5 |   |   |   | Reserved |   |   | Flag | Link |

|   | 7 | 6 | 5 | 4 | 3 | 2 | 1 | 0 |
|---|---|---|---|---|---|---|---|---|
| 0 |   |   |   | Operation Code 0 × 28 |   |   |   |   |
| 1 | Reserved |   |   | DPO(0) | FUA(0) | Reserved |   | RelAdr (0) |
| 2–5 |   |   |   | Logicat Block Address |   |   |   |   |
| 3 |   |   |   | Reserved |   |   |   |   |
| 7–8 |   |   |   | Transfer Length |   |   |   |   |
| 9 |   |   |   | Reserved |   |   | Flag | Link |

The Disable Page Out (DPO) and Force Unit Access (FUA) options are not supported, since tape drive caching is mandatory (as described above) in this embodiment. The Logical Block Address value indicates the starting location of a read, relative to block zero at the beginning of the block device (i.e. the emulated CD-ROM media). The Transfer Length indicates the number of blocks to be read from the tape drive 140 and transferred back to the tape drive 140.

If the requested data is not already stored in the cache, then the data can be read from the tape media by using the LOCATE and READ functions from the Normal Mode of operation. The LOCATE command is used to locate the tape media to the required starting read block location, and then the READ command is used in fixed block mode to read the requested number of blocks from the tape. The details of the CD-ROM image start location and fixed block format are described above.

The LOCATE command parameters are:

BT=1, CP=0

Block Address=20+Logical Block Address

The READ command parameters are:

Fixed=1

Transfer length=Transfer Length

Seek

In DR Mode, this command moves the logical position of the tape drive 140 to another block location (obviously this command is only normally valid in random access devices such as hard disk drives and CD-ROM drives) and replaces the standard tape drive 'LOCATE' CDB. The new CDB is:

|   | 7 | 6 | 5 | 4 | 3 | 2 | 1 | 0 |
|---|---|---|---|---|---|---|---|---|
| 0 |   |   |   | Operation Code 0 × 2B |   |   |   |   |
| 1 |   |   |   | Reserved |   |   |   |   |
| 2 | (MSB) |   |   |   |   |   |   |   |
| 3 |   |   |   | LOGICAL BLOCK ADDRESS |   |   |   |   |
| 4 |   |   |   |   |   |   |   |   |
| 5 |   |   |   |   |   |   |   | (LSB) |
| 6–8 |   |   |   | Reserved |   |   |   |   |
| 9 |   |   |   | Reserved |   |   | Flag | Link |

This allows the PC 100 to provide advance notification that particular data may be requested in a subsequent command. However, in DR Mode, the tape takes no action for this command, and 'GOOD STATUS' is always returned.

Read Capacity

This is a new CDB for CD-ROM drive emulation, which obtains the number of logical blocks contained in the media and the size of each block. The new CDB is:

|   | 7 | 6 | 5 | 4 | 3 | 2 | 1 | 0 |
|---|---|---|---|---|---|---|---|---|
| 0 |   |   |   | Operation Code 0 × 25 |   |   |   |   |
| 1 | LUN(0) |   |   | Reserved |   |   |   | RelAdr(0) |
| 2–5 |   |   |   | Logical Block Address (0) |   |   |   |   |
| 6–7 |   |   |   | Reserved |   |   |   |   |
| 8 |   |   |   | Reserved |   |   |   | PMI(0) |
| 9 |   |   |   | Reserved |   |   | Flag | Link |

The RelAdr, Logical Block Address and PMI fields only support zero values. Any non-zero values are ignored.

The following 'READ CAPACITY' data is returned, representing the maximum number of 2048 byte blocks:

| | 7 | 6 | 5 | 4 | 3 | 2 | 1 | 0 |
|---|---|---|---|---|---|---|---|---|
| 0 | (MSB) | Returned Logical Block Address (0 × 0004B000) | | | | | | |
| 3 | | | | | | | | (LSB) |
| 4 | (MSB) | Block Length in bytes (0 × 0000800) | | | | | | |
| 7 | | | | | | | | (LSB) |

Read Toc

This is a new CDB for CD-ROM drive emulation, which provides a means to obtain from a table of contents (TOC) the number of tracks and their locations. The new CDB is:

| | 7 | 6 | 5 | 4 | 3 | 2 | 1 | 0 |
|---|---|---|---|---|---|---|---|---|
| 0 | | | | Operation Code 0 × 43 | | | | |
| 1 | LUN(0) | | | Reserved | | MSF(0) | | Reserv'd |
| 2 | Reserved | | | | | Format (0) | | |
| 3 | | | | Reserved | | | | |
| 4 | | | | Reserved | | | | |
| 5 | | | | Reserved | | | | |
| 6 | | | | Track/Session Number (Hex) | | | | |
| 7 | (MSB) | | | Allocation Length | | | | |
| 8 | | | | | | | | (LSB) |
| 9 | | | | Reserved | | | Flag | Link |

The Format field only supports a value of 0, and any non-zero value used will return 'CHECK CONDITION' with sense key set to "Illegal Request" and extended sense set to "Illegal Parameter in CDB". The MSF bit supports values of 0 or 1, but the same TOC response data block is returned (see below) for both values.

The Track/Session Number field specifies the starting track number for which the data is returned. Since there is only one track possible on data CD-ROM media, any value other than 0 or 1 will return 'CHECK CONDITION' with sense key set to 'Illegal Request' and extended sense set to "Illegal Parameter in CDB".

The command returns a TOC response data block, as shown below. This contains four header bytes and then descriptor blocks for track 0x1 (data track) and track 0xAA (lead-out area). The values in the response data block are fixed:

| | 7 | 6 | 5 | 4 | 3 | 2 | 1 | 0 |
|---|---|---|---|---|---|---|---|---|
| 0 | (MSB) | | | TOC Data Length (0 × 0012) | | | | |
| 1 | | | | | | | | (LSB) |
| 2 | | | | First Track Number (0 × 01) | | | | |
| 3 | | | | Last Track Number (0 × 01) | | | | |
| 4 | | | | Reserved | | | | |
| 5 | | ADR (0 × 1) | | | | Control (0 × 4) | | |
| 6 | | | | Track Number (0 × 1) | | | | |
| 7 | | | | Reserved | | | | |
| 8–11 | | | | Logical Block Address (0 × 0000) | | | | |
| 12 | | | | Reserved | | | | |
| 13 | | ADR (0 × 1) | | | | Control (0 × 4) | | |
| 14 | | | | Track Number (0 × AA) | | | | |
| 15 | | | | Reserved | | | | |
| 16–19 | | | | Logical Block Address (0 × 0004B000) | | | | |

It will be appreciated that the present invention is described with particular reference to a PC, for example an MS-DOS based computer system or a Windows NT or Windows 95/98 computer system; historically sometimes known as an IBM-AT compatible machine. However, the concepts are equally applicable to any computer system which may not support booting from tape drive apparatus under normal circumstances, but is capable of interacting with tape drive apparatus for the purposes of enacting backup operations. In addition, it will be appreciated that the concept of booting from tape media is more broadly applicable than just for the purposes of DR. For example, any other appropriate application software may be stored on bootable tape media instead of, or as well as, a DR application. The following claims should therefore be interpreted accordingly, to encompass non-PC systems as well as PC systems, and non-DR applications as well as DR applications.

What is claimed is:

1. A method of executing application software in a system comprising computing apparatus and tape drive apparatus, the computing apparatus being bootable from a CD ROM and not being bootable from conventional tape drive apparatus, the method comprising the steps of:

generating bootable tape media, by storing to the tape media both application software and bootable data corresponding to that which the CD-ROM would provide to the computing apparatus during booting of the computing apparatus from the CD ROM;

initiating booting of the computing apparatus, causing the computing apparatus to attempt to locate a CD-ROM during the initial booting;

controlling the tape drive apparatus so the tape drive apparatus emulates CD ROM for interactions with the computing apparatus while the computing apparatus is booting, said controlling step resulting in the tape drive apparatus identifying itself to the computing apparatus as an initial program load device of a CD-ROM; and continuing with the operation of the computing apparatus by (a) recognising the tape drive apparatus as a CD-ROM initial program load device, (b) then booting the computer from the bootable data, and then (c) supplying the application software from the tape media to the computing apparatus via the tape drive mechanism.

2. Tape drive apparatus for use with a computing apparatus that is bootable from a CD-ROM and not bootable from a conventional tape drive apparatus, comprising:

a mechanism for controlling the position and motion of loaded tape media;

a read/write circuit for transferring data between the loaded tape media and the tape drive apparatus; and a controller for causing the tape drive apparatus to (a) identify loaded tape media including bootable data for the computing apparatus, (b) receive signals from the computing apparatus, (c) process signals which are intended for a CD-ROM, and (d) generate response signals which the computing apparatus would expect from the said CD-ROM.

3. A method of performing a data recovery operation in a system comprising computing apparatus and tape drive apparatus, the computing apparatus being bootable from a kind of initial program load device that is not a tape drive apparatus and not being bootable from a conventional tape drive mechanism, the method comprising the steps of:

generating a recovery tape media, by storing to the tape media both a backup data set and bootable data corresponding to that which a said kind of initial program load device would provide to the computing apparatus during booting of the computing apparatus from that device;

initiating booting of the computing apparatus, causing the computing apparatus to attempt to locate a said kind of initial program load device during the initial booting;

controlling the tape drive apparatus so the tape drive apparatus emulates a said kind of initial program load device for interactions with the computing apparatus while the computing apparatus is booting, said controlling step resulting in the tape drive apparatus identifying itself to the computing apparatus as an initial program load device of the aforesaid kind; and continuing with the operation of the computing apparatus by (a) recognising the tape drive apparatus as a said kind of initial program load device, (b) booting the computer from the bootable data, (c) causing the tape drive apparatus to operate as a tape drive apparatus and (d) recovering the backup data set from the tape drive apparatus.

4. A method according to claim 3, wherein the bootable data comply with the ISO 9660 format for CD-ROM apparatus and the El Torito Bootable CD-ROM Format Specification.

5. A method according to claim 3, wherein the bootable data comprise data and/or files which, when executed, allow the computing apparatus to access a tape drive apparatus and restore therefrom the backed-up data set from the recovery tape media loaded in the tape drive apparatus, and further including executing the bootable data and/or files of the bootable data, and causing the computing apparatus to access a tape drive apparatus and restore therefrom the backed-up data set from the recovery tape media loaded in the tape drive apparatus.

6. A method according to claim 3, further including writing the bootable data to the recovery tape media starting at a pre-determined offset from the beginning of the tape media.

7. A method according to claim 6, wherein the bootable data are written to recovery tape media starting in the $21^{st}$ block from the logical beginning of the recovery tape media.

8. A method according to claim 3, wherein the bootable data precede the backup data set on the recovery tape media.

9. A method according to claim 3, wherein the control step includes emulating the said kind of initial program load device by user operation of an initialisation arrangement associated with the tape drive apparatus.

10. A method according to claim 9, wherein the user operation includes operating an eject button of the tape drive apparatus while the tape drive apparatus is being powered on.

11. A method according to claim 3, further including switching the tape drive apparatus to operate as a tape drive apparatus in response to receipt of a specific signal from the computing apparatus.

12. A method according to claim 3, further including switching the tape drive apparatus to operate as a tape drive apparatus in response to (a) receipt of a specific signal from the computing apparatus, and (b) the amount of data exceeding a predetermined threshold having been read by the computing apparatus from the tape drive apparatus.

13. A method according to claim 3, further including activating the tape drive apparatus in response to a status request signal from the computing apparatus, which is attempting to locate a said kind of initial program load device, to cause the tape drive apparatus to return a signal indicating that it is in the process of loading media, even if a medium is not present, and responding to the returned signal to cause the computing apparatus to wait for an extended period of time before attempting to communicate with an alternative initial program load device.

14. A method according to claim 3, further including causing the tape drive apparatus to read at least some of the bootable data from the recovery tape media and cache into volatile memory of the tape drive.

15. A method according to claim 14, wherein said bootable data read from cache in the volatile memory include directory data representative of the arrangement of the files included in the bootable data.

16. A method according to claim 14, wherein said cached bootable data include at least some files in the bootable data that need to be accessed more than once during the recovery operation, and accessing said at least some files more than once during the recovery operation.

17. A method according to claim 6, further including causing the tape drive apparatus to locate the start of the bootable data on the recovery tape media by starting from the logical beginning of the tape media and reading forwards by the pre-determined offset.

18. A method according to claim 3, further including causing the computing apparatus to generate bootable data including a plurality of data files by ordering the files in substantially the order in which they are subsequently read by the computing apparatus from a recovery tape media during a recovery operation.

19. Tape drive apparatus arranged for operation in accordance with the method as claimed in claim 1.

20. Computing apparatus arranged to generate recovery tape media suitable for use in accordance with the method of claim 1.

21. Computing apparatus arranged to operate according to the method of claim 1.

22. A memory storing a computer program comprising computer program code for performing the method of claim 1 when said program is executed on said computing apparatus.

23. A memory storing a computer program according to claim 22, adapted to generate recovery tape media as part of a data backup operation.

24. A system for performing the method claimed in claim 1.

25. Tape drive apparatus for use with a computing apparatus that is bootable from a kind of initial program load device that is not a tape drive apparatus and not bootable from a conventional tape drive apparatus, comprising:

a mechanism for controlling the position and motion of loaded tape media;

a read/write circuit for transferring data between the loaded tape media and the tape drive apparatus; and a controller for controlling the operation of the tape drive apparatus, the tape drive apparatus including two modes of operation, the controller being arranged to selectively control the tape drive apparatus to operate in one of the two modes of operation, in which:

a) in a first mode, the tape drive apparatus having a first operating mode for (i) identifying loaded tape media as including bootable data for the computing apparatus, (ii) receiving signals from the computing apparatus, (iii) processing signals which are intended for a kind of initial program load device that is not a tape drive apparatus and (iv) generating response signals which the computing apparatus would expect from the said kind of initial program load device; and b) in a second mode, the tape drive apparatus is arranged to operate in accordance with normal tape drive apparatus operation.

26. Apparatus according to claim 25, wherein, when in the first mode, the controller is arranged to generate, in reply to a device type inquiry signal from the computing apparatus, a response for identifying the tape drive apparatus as the said kind of initial program load device.

27. Apparatus according to claim 25, wherein, when in the first mode, the controller is arranged to identify the loaded recovery tape media as including bootable data by reading, from the tape media, data starting at a pre-determined offset from the beginning of the recovery tape media.

28. Apparatus according to claim 27, wherein the predetermined offset is the $21^{st}$ block from the logical beginning of the recovery tape media.

29. Apparatus according to claim 25, further comprising a random access memory, wherein the controller is arranged to read at least some of the bootable data into the random access memory, such that for subsequent accesses of said data by the computing apparatus the controller is arranged to access the random access memory rather than the tape media.

30. Apparatus according to claim 25, further comprising a user selector arranged to be responsive to user operation to cause the tape drive apparatus to operate in the first mode.

31. Apparatus according to claim 30, wherein the user selector comprises an eject button of the tape drive apparatus, and the controller is arranged to detect user operation of the eject button during a power on, or reset, operation of the tape drive apparatus.

32. Apparatus according to claim 25, wherein the controller is connected to be responsive to receipt of a particular signal from the computing apparatus for switching the operation of the tape drive apparatus from the first mode to the second mode.

33. Apparatus according to claim 25, wherein the said kind of initial program load device is a CD-ROM drive, the tape including the standard bootable image of a CD-ROM.

34. A method of generating a recovery tape media, the method comprising the steps of:
   generating bootable data corresponding to that which a CD-ROM would provide to a computing apparatus during booting thereof, the computing apparatus being bootable from a CD-ROM and not being bootable from a conventional tape drive apparatus;
   generating a backup data set; and
   writing the bootable data and the backup data set to a recovery tape media.

35. A method according to claim 34, wherein the bootable data comprise data arranged to comply with the ISO 9660 format for CD-ROM apparatus and the El Torito Bootable CD-ROM Format Specification.

36. A method according to claim 34, wherein the bootable data are written to the recovery tape media starting at a predetermined offset from the beginning of the tape media.

37. A method according to claim 36, wherein the bootable data are written to the recovery tape media starting in the $21^{st}$ block from the logical beginning of the recovery tape media.

38. A method of reading particular data which are stored on a sequential-access data storage medium, comprising the steps of:
   receiving data read signals intended for retrieving the particular data from a random access data storage medium;
   interpreting the said data read signals as signals intended for reading from the sequential-access data storage medium; and
   on the basis of the said interpreted read signals, reading the particular data from the sequential-access data storage medium.

39. A method according to claim 38, further comprising the step of caching at least some of the data from the sequential-access data storage medium into random access memory, and, on the basis of the said interpreted read signals, indirectly reading the particular data from the sequential-access data storage medium by reading the particular data from the random access memory.

40. A method according to claim 38, further comprising the preliminary step of arranging the data on the sequential-access data storage medium in substantially the sequence in which the particular data would have been read from the random access data storage medium.

41. A device or apparatus arranged for operation in accordance with the method of claim 38.

42. A controller device for controlling a storage system to execute application software, the storage system comprising computing apparatus and tape drive apparatus, the computing apparatus being bootable from a kind of initial program load device that is not a tape drive apparatus and not being bootable from a conventional tape drive apparatus, the controller device being programmed for controlling the storage system for performing the steps of:
   generating bootable tape media, by storing to the tape media both application software and bootable data corresponding to that which a said kind of initial program load device would provide to the computing apparatus during booting of the latter from that device;
   initiating booting of the computing apparatus, thereby causing the computing apparatus to attempt to locate a said kind of initial program load device;
   controlling the tape drive apparatus to emulate a said kind of initial program load device for interactions with the computing apparatus while the latter is booting, whereby the tape drive apparatus identifies itself to the computing apparatus as an initial program load device of the aforesaid kind; and
   continuing with the computing apparatus recognizing the tape drive apparatus as a said kind of initial program load device, booting from the bootable data and executing the application software.

43. Apparatus according to claim 26, wherein the said kind of initial program load device is a CD-ROM drive, the tape including the standard bootable image of a CD-ROM.

44. The apparatus of claim 27 wherein the said kind of initial program load device is a CD-ROM drive, the tape including the standard bootable image of a CD-ROM.

45. The method of claim 3 wherein the said kind of initial program load device is a CD-ROM drive, the tape including the standard bootable image of a CD-ROM.

46. The method of claim 34 wherein the said kind of initial program load device is a CD-ROM drive, the tape including the standard bootable image of a CD-ROM.

47. The method of claim 36 wherein the offset is behind a software vendor header and padding blocks, the length of the software vendor header and the number of padding blocks being such that the predetermined offset is provided.

48. An elongated tape storing (a) a standard bootable image of a CD-ROM followed by a file mark, (b) a software vendor header and (c) backup data following (a).

49. The apparatus of claim 48 wherein (a) begins at the logical beginning of the tape.

50. The apparatus of claim 48 wherein (a) begins at a predetermined offset location of the tape beyond the logical beginning of the tape.

51. The tape of claim 50 wherein the offset is behind a software vendor header and padding blocks, the length of the software vendor header and the number of padding blocks being such that the predetermined offset is provided.

52. A method of forming the elongated tape of claim 50 comprising the steps of:

writing label blocks with standard application software block sizes beginning at the logical beginning of the tape;

reading and saving the normal block size using a mode select command;

changing block size from an original block size to a predetermined block size using the mode select command;

writing N null blocks at a position beginning at the end of the write label blocks, the N blocks being written on the tape until a specified start location of the CD-ROM image is reached;

writing the CD-ROM image to the tape beginning at the point of the tape at the end of the N null blocks;

then resetting the block size back to the original application block size; and writing the file mark on the tape at a point where the CD-ROM image ends.

53. The method of claim 52 further including disabling any compression function associated with writing data on the tape prior to the CD-ROM image being written on the tape so that the CD-ROM images are written without compression; and enabling any compression that is usually applied to data being applied to the tape prior to such data being applied after the CD-ROM image has been written.

54. The method of claim 53 wherein the compression is enabled before the file mark is written to the tape.

* * * * *